United States Patent
Clement et al.

(10) Patent No.: US 12,515,472 B2
(45) Date of Patent: Jan. 6, 2026

(54) METHOD FOR MANUFACTURING INKJET PRINTABLE PAPER OR FOIL FOR USE AS A DECOR PAPER OR FOIL

(71) Applicant: Unilin, BV, Wielsbeke (BE)

(72) Inventors: Benjamin Clement, Waregem (BE); Michiel Bliek, Ghent (BE)

(73) Assignee: Unilin, BV, Wielsbeke (BE)

( * ) Notice: Subject to any disclaimer, the term of this patent is extended or adjusted under 35 U.S.C. 154(b) by 0 days.

(21) Appl. No.: 18/002,112

(22) PCT Filed: Jun. 23, 2021

(86) PCT No.: PCT/IB2021/055529
§ 371 (c)(1),
(2) Date: Dec. 16, 2022

(87) PCT Pub. No.: WO2022/003494
PCT Pub. Date: Jan. 6, 2022

(65) Prior Publication Data
US 2023/0347677 A1   Nov. 2, 2023

(30) Foreign Application Priority Data

Jun. 30, 2020 (EP) .................................... 20183203

(51) Int. Cl.
*B41M 5/52* (2006.01)
(52) U.S. Cl.
CPC ........ *B41M 5/5218* (2013.01); *B41M 5/5227* (2013.01)
(58) Field of Classification Search
CPC ........................... B41M 5/5218; B41M 5/5227

USPC ....................................................... 428/32.36
See application file for complete search history.

(56) References Cited

U.S. PATENT DOCUMENTS

| | | | | |
|---|---|---|---|---|
| 2002/0048655 A1* | 4/2002 | Ichinose | ................ | C09D 11/32 428/32.35 |
| 2003/0049414 A1* | 3/2003 | Ichinose | .............. | B41M 5/5218 428/195.1 |
| 2003/0224127 A1* | 12/2003 | Burch | ...................... | B41M 5/52 428/32.1 |
| 2007/0171267 A1* | 7/2007 | Tojo | ........................ | C09D 11/32 347/100 |
| 2008/0268186 A1* | 10/2008 | Burch | .................... | D21H 19/40 428/32.33 |
| 2009/0126584 A1 | 5/2009 | Nakano | | |
| 2009/0130320 A1* | 5/2009 | Kawakami | ............. | B41M 5/502 428/32.18 |

(Continued)

FOREIGN PATENT DOCUMENTS

| | | |
|---|---|---|
| EP | 1044822 B1 | 10/2000 |
| EP | 1290290 B1 | 3/2003 |

(Continued)

*Primary Examiner* — Betelhem Shewareged
(74) *Attorney, Agent, or Firm* — Capitol City TechLaw (57) ABSTRACT

A method is provided for manufacturing a paper or a thermoplastic foil printable with an inkjet printer for use as a decor paper or a decor foil in a laminate panel. The method may involve providing a paper layer or a thermoplastic foil. At least one side of the paper layer or the thermoplastic foil may be coated with an inkjet receiver coating that includes at least a pigment. The pigment may include aluminum silicates or combinations thereof.

10 Claims, 4 Drawing Sheets

(56) References Cited

U.S. PATENT DOCUMENTS

| | | | | |
|---|---|---|---|---|
| 2009/0169777 A1* | 7/2009 | Missell | ............... | B41M 5/504 |
| | | | | 428/32.22 |
| 2013/0065468 A1* | 3/2013 | Scott, Jr. | ............. | C09D 133/08 |
| | | | | 428/513 |
| 2015/0298478 A1* | 10/2015 | Nagoshi | ............. | B41M 5/5245 |
| | | | | 428/32.25 |
| 2017/0267010 A1 | 9/2017 | Takada et al. | | |
| 2019/0390411 A1 | 12/2019 | Charignon | | |
| 2023/0347677 A1* | 11/2023 | Clement | ............... | B41M 5/52 |

FOREIGN PATENT DOCUMENTS

| | | |
|---|---|---|
| EP | 1749676 B1 | 2/2007 |
| EP | 1857511 B1 | 11/2007 |
| EP | 1872959 B1 | 1/2008 |
| EP | 2132041 B1 | 12/2009 |
| EP | 2274485 B1 | 1/2011 |
| EP | 2293946 B1 | 3/2011 |
| EP | 2431190 B1 | 3/2012 |
| EP | 2905376 B1 | 8/2015 |
| WO | 2009018370 A2 | 2/2009 |
| WO | 2011124503 A2 | 10/2011 |
| WO | 2013141706 A1 | 9/2013 |
| WO | 2014084787 A1 | 6/2014 |
| WO | 2015118451 A1 | 8/2015 |
| WO | 2015140682 A1 | 9/2015 |
| WO | 2019187889 A1 | 10/2019 |

\* cited by examiner

METHOD FOR MANUFACTURING INKJET PRINTABLE PAPER OR FOIL FOR USE AS A DECOR PAPER OR FOIL

This application claims priority under 35 USC § 119(a)-(d) to EP patent application No. 20183203.7, which was filed on Jun. 30, 2020, the entire content of which is incorporated herein by reference.

BACKGROUND

1. Field

The present invention relates to a method for manufacturing panels having a decorative surface, or, so-called decorative panels. The invention also relates to a method for manufacturing paper or foil printable with inkjet for use as a decor paper or decor foil in such panels and to the paper or foil obtainable with such method. According to a variant the obtained decor paper or decor foil may be used in a laminated assembly other than a panel, such as in so-called CPL (compact laminate) or HPL (high pressure laminate) or in room-wide heterogenous vinyl flooring.

More particularly the invention is related to a method for manufacturing laminate panels, wherein said panels at least comprise a substrate material and a provided thereon top layer with a printed decor. According to a first possibility, the method could be used for manufacturing panels, the top layer of which is formed from thermosetting resin and one or more paper layers, wherein said paper layers comprise a decor paper having a printed pattern. According to a second possibility, the method could be used for manufacturing panels, the top layer of which is formed from thermoplastic material, such as PVC, including at least one thermoplastic decor foil having a printed pattern. The panels of the invention may relate to furniture panels, ceiling panels, flooring panels or similar, wherein these panels preferably comprise a wood based substrate, such as an MDF or HDF substrate (Medium or High Density Fiberboard) or a substrate material consisting of or essentially made of wood particleboard. According to an alternative embodiment, which is of particular interest in combination with the above second possibility, the panels comprise a filled synthetic composite material substrate or a mineral based substrate. These latter panels are also referred to as LVT panels (Luxury Vinyl Tiles).

2. Related Art

Traditionally, the decor or pattern of such panels is printed on paper or thermoplastic foil by means of offset or rotogravure printing. The obtained paper or foil is taken up as a decorative paper or decor foil in a so-called laminate panel or LVT panel. For manufacturing the panels of the above mentioned first possibility the DPL process can be practiced. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to EP 1 290 290, from which it is further known to provide a relief in said melamine surface during the same press treatment or pressing operation, namely by bringing said melamine surface in contact with a structured press element, for example a structured press plate. For manufacturing the panels of the above mentioned second possibility, preferably also at least a lamination of the decor foil and a transparent thermoplastic wear layer is carried out in order to form the top layer of the panel. The mutual connection or adherence of the decor foil and the transparent wear layer is preferably obtained through a thermal lamination process, e.g. by using one or more heated press rollers. The obtained top layer may then be glued or thermally laminated to the substrate. In order to possibly form a relief in the top layer a press treatment or pressing operation may be used. Namely by bringing the thermoplastic top layer in contact with a structured press element, for example a structured press roller. The press element is preferably cooled, while the thermoplastic top layer is presented to the roller in a heated condition, such that the thermoplastic top layer may be cooled down and frozen while in contact with the press element, thereby taking over the negative of the structure of the press element.

The printing of paper or thermoplastic foil by means of an analog printing process, such as by rotogravure or offset printing, at affordable prices inevitably leads to large minimal order quantities of a particular decorative paper or foil and restricts the attainable flexibility. A change of decor or pattern necessitates a standstill of the printing equipment of about 24 hours. This standstill time is needed for exchange of the printing rollers, the cleaning of the printing equipment and for adjusting the colors of the new decor or pattern to be printed.

Instead of analog printing techniques, digital printing techniques, especially inkjet printing techniques, are becoming increasingly popular for the creation of decors or patterns, be it on paper, on foil or directly on a plate-shaped substrate possibly with the intermediary of preparatory layers. Such digital techniques can enhance the flexibility in the printing of decors significantly. Reference is amongst others made to the EP 1 872 959, WO 2011/124503, EP 1 857 511, EP 2 431 190, EP 2 293 946, WO 2014/084787, WO 2015/140682 and the WO 2015/118451, where such techniques are disclosed.

EP 2 132 041 discloses a method at least comprising the step of providing a paper layer with thermosetting resin and the step of providing said resin provided paper layer with at least a portion of said printed pattern. Preferably multi-color printed patterns are applied for the realization of a decor, e.g. representing a wood pattern, on the abovementioned paper layer. Such decor extends over the majority, or even over the totality of the resin provided paper layer. In EP 2 132 041, a digital printer, more particularly an inkjet printer is applied. It has however been very difficult to reliably further process such printed paper for manufacturing laminate panels, such as in a DPL process, since pressing defects may originate in the resin surface and milling, drilling or sawing through the laminate surface or at the edge thereof often leads to splitting in the top layer. Furthermore, the inks or dyes of the EP'041 may overly wet the paper layer and cause wrinkling effects or bleeding upon further handling of the printed paper, leading to an instable and/or slow production process. To solve this issue the EP'041 propose to immediately dry the printed paper layer.

EP 1 044 822, EP 1 749 676 and EP 2 274 485 disclose the use of an inkjet receiver coating to enhance the printing quality on a raw decor paper. Such inkjet receiver coating comprises pigments, especially silica, and a crosslinked polymer such as polyvinyl alcohol (PVA).

As recognized in WO 2015/118451 the use of paper treated with an inkjet receiver coating may lead to malfunctioning of the printing equipment. Dust may release from the inkjet receiver coating and bring about all sorts of malicious effects to the critical parts of an inkjet printer. The dust may for example clog one or more of the nozzles and lead to printing faults. WO 2015/118451 proposes to avoid too large a bent in the paper in the printing equipment to minimize the release of dust. It is to be noted that in case of printing over a central cylinder or drum, the risk for dust release is even higher and should be avoided because of bending of the paper over the drum during the printing operation.

During private research, the inventor has also encountered problems with subsequent impregnation of dust releasing paper layers, even in the cases where the paper layers were already printed upon. The released dust may pollute the resin bath, the rollers, cameras and other equipment in, or in the immediate vicinity of, the impregnation channel, leading to defects in the final product or of the equipment used.

Anyway, silica an PVA are relatively expensive. Moreover, in order to crosslinking the PVA, a crosslinking agent such boric acid can be used Said crosslinking agent can be noxious or anyhow harmful substances. Moreover, the said inkjet receiver coating highly increases the Gurley valuer of the paper thereby affecting the resin penetration time and, consequently, a possible subsequent resin impregnation step.

SUMMARY

The present invention aims in the first place at an alternative method for manufacturing panels having a decorative surface or paper, respectively thermoplastic foil, for use in such panels, and seeks, in accordance with several of its preferred embodiments, to solve one or more of the problems arising in the state of the art.

Therefore the present invention, in accordance with its first independent aspect, relates to a method for manufacturing paper or thermoplastic foil printable with an inkjet printer for use as a decor paper, respectively decor foil, in a laminate panel, wherein the method at least comprises the following steps:

the step of providing a paper layer or a thermoplastic foil;
the step of coating at least one side of said paper layer, respectively of said foil, with an inkjet receiver coating comprising at least a pigment;

with as a characteristic that said pigment comprises aluminum silicates or combinations thereof. Preferably, said aluminosilicates comprise talc, clays, calcined clays, kaolin. The inventors have found that aluminum silicate shows an agglomeration behavior that improves the dust release performance, i.e. the inkjet receiver layer releases only a small amount of dust or does not release dust at all. Moreover, the inventors have found that this improvement of dust release performance occurs even in presence of a small amount, or in absence, of binder.

In the preferred embodiment, the pigment of the inkjet receiver coating is composed for at least the 50%, preferably more than 75%, even more preferably more than 90%, based on the whole pigment weight, of talc, clays, calcined clays, kaolin and/or other aluminum silicates or combinations thereof. In the most preferred embodiment, the pigment substantially consists of talc, clays, calcined clays, kaolin and/or other aluminum silicates or combinations thereof.

More in general as pigment used in the invention, any inorganic pigment may in fact be used. Mixtures of two or more pigments may also be used. The pigment used is preferably an inorganic pigment, which can be chosen from neutral, anionic and cationic pigment types. Useful pigments include e.g. talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides. The inorganic pigment is preferably selected from the group consisting aluminum silicates, like for example talc, clays, calcined clays, kaolin. Particularly preferred inorganic pigments are kaolins as they provide a white color to the inkjet receiver coating. Kaolin can be natural, or purified kaolin, for example calcined kaolin, freeze dried and/or acid treated kaolin are preferred solution.

It is not excluded that the pigments comprise silica as the filler, but in this case the amount of silica is limited to less than the 10 wt %, more preferably less than 1 wt % based on the whole content of pigments, for example between 10 wt % and 0 wt %, preferably between 1 wt % and 0% wt. In any case, according to the preferred solution, the inkjet receiver coating is substantially free from silica. It is to be noted that the inventors have surprisingly found that although silica, as well as other porous pigments, shows a better ink vehicle (especially water) absorption performance than kaolin, for being much more porous, it doesn't show any agglomeration behavior. Therefore, an inkjet receiver coating comprising silica, needs a relatively high quantity of binder to bind together silica particles and to ensure proper bonding on the substrate and improve dust release performance of the coating itself (It is to be remembered that an improvement of dust release performance means a reduction of dust release). Anyway, the inventors have found that the binder is absorbed by the porosity of silica particles thereby filling said porosity and reducing the absorption capability of silica particles.

Preferably the pigments included in the inkjet receiver coating have an average particle size of 0.2 μm to 10 μm, wherein 0.5 μm-5 μm is a preferred range. Small particle size pigments can be easily bound to the paper or foil and agglomerate each other, while large particle size pigments show great water absorbency, thereby leading to a good printing quality. The optimum average particle size is in the range between 0.5 to 5 μm.

Preferably, the pigments included in the inkjet receiving layer have an average surface area (BET) above 20 $m^2/g$, more preferably above 30 &/g, in order to obtain a good absorbency of the ink vehicle. The pigments included in the inkjet receiving layer may have an average surface area (BET) below 150 $m^2/g$ and preferably below 90 &/g. It is to be noted that although the average surface area of silica is higher than that kaolin, it is partially unavailable for absorbing the ink vehicle as it is occupied by the binder. Therefore, because of lower need of binder, the surface area of kaolin is substantially completely available for absorbing the ink vehicle.

Preferably, said inkjet receiver coating is provided with 30 to 85% based on the dry weight of pigment in said inkjet receiver coating. Preferably, the coating is such that the pigments create a surface of 10 m² to 1000 m² surface area of paper or foil, or even better between 150 and 500 m² of pigment surface per m² of paper or foil surface.

Preferably, the inkjet receiver layer comprises a binder in a content lower than 10 wt %, more preferably below 5 wt %, even more preferably below 1 wt %, for example between 1% and 0%, based on the dry weight of inkjet receiver layer. In the most preferred embodiment, the inkjet receiver layer is free from any binder. It is noted that reducing the content of binder reduces the cost and simplifies the manufacturing and application of the inkjet receiver coating.

In case of presence of the binder in said inkjet receiver coating at least or mainly polyvinyl alcohols are used.

According to variants, the inkjet receiver coating includes, as a binder, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide % acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar. The most preferred variants for the binder are polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a watery dispersion/emulsion or a watery or solvent solution. As stated above preferred binders for the inkjet receiving layer include polyvinyl alcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL Cl18 from Nippon Goshei.

Preferably, said inkjet receiver coating has, globally seen, a pigment to binder ratio between 25/1 and 100/1, preferably between 40/1 and 100/1, even more preferably between 60/1 and 100/1, for example around 75/1. It is not excluded that the inkjet receiver coating is non uniform and shows layerwise or areawise differences in composition, in which case the above values are average values for the totality of the inkjet receiver coating.

It is to be noted that, in case of presence of binder, the ink receiver coating can comprise also a crosslinking agent for the crosslinking reaction of the binder itself. In any case it is noted that the content of said crosslinking agent will be limited because of the low amount of binder, moreover, the crosslinking agent can also be completely absent even in presence of binder, especially if the binder is limited to less than 5% by weight. Therefore, another advantageous consequence of using kaolin or other aluminosilicate as the pigment is that it is reduced the need of crosslinking. Therefore, the inkjet receiver coating can preferably comprise a content of crosslinking agent below 5% based on dry weight of the composition, preferably the inkjet receiver layer is substantially free from crosslinking agents. In case of presence of a crosslinking agent this is preferably selected from the group comprising: aldehydes, polyaldehydes, dialdehydes, alcohols, boronic acid, borax, polyalcohols, carbamates, polycarbamates, carbonic acids, glyoxal based agent, zirconium-based agents, titanates and polycarbonic acids.

The inkjet receiver coating can further comprise a dispersant. A dispersant is an oligomer or polymer which stabilize the liquid dispersions of pigment against flocculation. The dispersant can comprise polycarboxylates, polyphosphates, a polyionic polymer, preferably polyDADMAC (Polydiallyldimethylanmnonium chloride) polyamine or alumina salts.

Preferably, the inkjet receiver coating is provided with less than 10%, more preferably less than 5% based on dry coating weight of dispersant, for example between 5 and 0%. Preferably, said inkjet receiver coating has, globally seen, a pigment to dispersant ratio between 10/1 and 100/1, more preferably it has a pigment to dispersant and binder ratio between 10/1 and 100/1.

The inkjet receiver coating can also comprise a flocculant, preferably a metal salt, preferably a cationic metal salt. Preferably said metal salt is chosen from the list consisting of $CaCl_2$, $MgCl_2$, $CaBr_2$, $MgBr_2$, CMA (Calcium Magnesium Acetate), $NH_4Cl$, Calcium Acetate. $ZrCl_4$, calcium nitrate and Magnesium Acetate. The positive ion of the dissolved metal salt will tend to neutralize the electrosteric stabilization function of the pigment. The most preferred cationic metal salts are $CaCl_2$, $MgC_2$. CMA, Calcium Acetate, calcium nitrate and Magnesium Acetate, as the inventors have obtained the best results with these ink reactive compounds. Said flocculant can also be chosen from the list consisting of sodiumaluminate, a double sulphate salt such as alum, polyaluminumchloride, polyacrylate, dicyandiamide (e.g. Floquat DI5 from SNF) and polyacrylamide. The flocculating agent pulls the ink pigments out of the ink dispersion. Thereby the pigments are prevented from penetration to far down into the ink receiver coating. Mainly the vehicle of the ink, e.g. the water in the case of waterbased inks, is absorbed deeper down into the ink receiver coating.

Preferably, inkjet receiver coating is provided with 20 to 60%, based on dry coating weight of flocculating agent, in particular of metal salt.

The inkjet receiver coating may also comprise one or more of the following agents:

Agents altering, more particularly lowering, the pH of said inkjet receiver coating. Preferably the pH of the inkjet receiver coating composition is lowered to pH 5 or lower, by selecting the amount and type of said substance, which selection is within the ambit of the skilled man. Preferably said substance is chosen from the list consisting of formic acid, tartaric acid, acetic acid, hydrochloric acid, citric acid, phosphoric acid, sulfinic acid, $AlCl_3$ and boronic acid. An adjusted, more particularly lowered pH, preferably to pH 5 or less, increases the chemical affinity of the inkjet receiver coating with the ink and will interfere with the electrosteric stabilization function on the pigment, such that the dispersion of the pigments in the ink will become destabilized quickly.

Particle surface modifying agents or coupling agents: between 0.05 and 5 g/m$^2$, preferably between 0.2 and 2 g/m$^2$, e.g. chosen from the non-limiting list consisting of amino silanes, ureido silanes, aldehyde silanes, tetraethylorthosilicate, siliazanes, organically modified silanes, organically modified siliazanes, chlorosilanes, organically modified chlorosilanes, bissilanes, organobissilanes, silsesquioxanes, polysilsesquioxnes, silane oligomers, organically modified silane oligomers, bissilane oligomers, organically modified bissilane oligomers, oligomeric silsesquioxanes, and oligomeric polysilsesquioxanes.

Additives: wetting agent between 0.005 and 2 g/m$^2$, preferably between 0.05 and 1 g/m$^2$; and/or defoaming agent between 0.005 and 2 g/m$^2$, preferably between 0.05 and 1 g/m$^2$; and/or fungicide between 0.005 and 2 g/m$^2$, preferably between 0.05 and 1 g % m.

Preferably, said paper or foil is provided with 0.2 to 10 g/m$^2$, and preferably between 0.5 and 5 g/m$^2$ dry weight of said inkjet receiver coating.

Preferably the paper layer or thermoplastic foil onto which the inkjet receiver coating is applied has a base weight of 50 to 100 grams per square meter, e.g. between 60 and 80 grams per square meter.

Preferably, in the case of a paper layer, the side of the paper layer unto which the inkjet receiver coating is to be applied has been smoothened (German: geglattet), preferably during its production. The smoothening diminishes the amount of binder penetrating the paper's core, such that the pigments contained therein can be better bound by the available binder substance and variations in absorption may be less. Preferably, the paper obtained using the method of the invention, i.e. including the inkjet receiver coating, has a Gurley value of between 10 and 60 seconds, and preferably between 12 and 40 seconds. Preferably, the paper layer can show, after application of the ink receiver coating, an increase of the Gurley value of less than 25% more preferably less than 15% based on the initial Gurley value of the uncoated paper layer. Such paper layer results in an excellent printing quality, since the deposited inks tend to bleed less into the paper, and the position accordance, or so-called register, between printed patterns applied with different inkjet heads is more easily attained and maintained. It is to be noted that the above indicated Gurley value of the coated paper layer is definitely lower than other coated paper layer, especially than those of paper layers coated with coating comprising silica and binder, in particular high quantity of crosslinked binder. Such a low Gurley value improves the resin impregnation capability of the paper layer, so that said paper layer are particularly suitable in use for decoration of panels, like for furniture or floor panels where the decorative paper is impregnated with melamine resin before lamination onto a supporting board. The paper layer comprising the inkjet receiver coating shows a resin penetration time lower than 3 sec. It is also to be noted that the fact that the impregnation of the paper is improved because of the low Gurley value, that is a consequence of the inkjet receiver coating composition, significantly improves lamination of the paper on top of the substrate if compared to standard paper for inkjet. This is particularly a consequence of the fact that improvement of impregnation means a more homogeneous impregnation of the paper.

Preferably, in the method of the invention, the paper or foil is intended to be printed using water-based inks or UV curing inks or hydro-UV inks, in particular comprising pigmented inks. In the first place the papers and foils obtained through the method of the first aspect are intended to be printed upon using inkjet printing equipment. However, the inventors have also found enhanced printing quality with the use of thus treated papers and foils in analog printing equipment.

According to the most preferred embodiment said inkjet receiver coating is applied in one step in order to form a unique layer having the inkjet receiving coating composition. Anyway, it is not excluded that said inkjet receiver coating is applied in at least two partial steps, wherein respectively a first layer with a first composition and, subsequently, a second layer is applied with a second composition wherein said first and second composition may be either the same or different compositions.

Preferably, a paper obtained with the method of the invention is provided with thermosetting resin, such as melamine resin, preferably after providing it with a printed pattern by means of inkjet printing. For this reason, preferably the paper layer is only provided with an inkjet receiver coating at one side thereof, namely at the side provided to be printed upon. The other, opposite, side, is preferably untreated, such that this opposite side shows the original porosity of the paper layer from which it is started. The resin may then be provided substantially from the bottom side into the papers core. To allow sufficient impregnation of the paper having the inkjet receiving coating, the speed of the impregnation channel may be tuned down, the resin may be made less viscous, the impregnation may be pressurized and/or the resin may be heated, e.g. to between 3° and 50° C.

Generally, it is noted that, although the paper and foil obtained with the method of the invention is printable with an inkjet printer, it is not excluded that the paper or foil eventually is printed using other techniques, such as rotogravure or offset printing. Also in such case, the diminished dust release and the potentially better printing quality is of interest. This is especially the case when aqueous inks are being used.

Preferably, said inkjet receiving coating is a liquid substance which is deposited on said paper layer, and which is preferably forcibly dried e.g. in a hot air oven or by means of infrared or near infrared light or by means of microwave drying. Preferably the liquid substance is a water based suspension of at least said binder, and possibly said pigments. Preferably the liquid substance composition has a dry matter content of 4 to 65 percent by weight of the liquid substance. Preferably the dry matter content as expressed by weight percentage is higher in the first composition than in the second composition.

The deposition of said liquid substance of the inkjet receiver coating can be obtained in any way, possibly by means of printing. e.g. inkjet printing, but preferably by means of coating techniques, such as roller coating, e.g. by means of one or more gravure rollers, spraying, metering rollers, bead coating, scattering, slot die coating. With the latter techniques, preferably a coating is obtained that covers at least 80% e of the surface of the paper layer or foil. Inline measurement systems may be desirable to steer and control the weight of the inkjet receiver coating. Such technique brings down the risk of obtaining uncoated areas of the paper, which could lead to local flaws in the printed pattern. A preferred equipment for application of the liquid substance is a rotogravure or anilox coating device.

The deposition of the liquid substance for the ink receiving coating may be performed in a rotogravure coating line or, alternatively, on the printing equipment, immediately before the printing operation. This last case solves any possible issues with limited shelf life of the inkjet receiver coating. Preferably the deposition of the liquid substance is performed while the paper or foil is still in an "endless" shape, namely taken from the roll without cutting. Such techniques allow for a more uniform application of the inkjet receiver coating. In the case the coating is wholly or partially done on the printing equipment, the printing equipment is preferably a roll-to-roll or a roll-to-sheet printer, comprising a coating device upstream of the print heads, for example a gravure coater and/or additional printing heads suitable for printing the liquid substance for the respective sublayer of the inkjet receiver coating. Such additional printing heads, for example an additional row of printing heads, may have nozzles with a larger diameter than those used for the actual printing of the pattern. A resolution of 1 to 100, or even 1 to 25 dots per inch may suffice for these nozzles.

It is also possible that the inkjet receiver coating may be applied directly in line with the paper machine with a sizepress or even more preferable a film press.

Said liquid substance for said inkjet receiver coating preferably shows a viscosity of 10 to 75 seconds Din cup 4 at 20° C. Such property allows for a straightforward application of the liquid substance to the surface of the paper layer or foil. In experiments, a solid content of about 12% and viscosity of about 20-seconds yielded a sufficiently uniform coating on a previously untreated paper layer, e.g. when applied by means of a roller coater.

It is clear that, instead of a paper layer, a thermoplastic foil, such as polyvinylchloride (PVC) foil, polypropylene (PP) foil, polyethylene (PE) foil, polyethylene-terephthalate (PET) foil or thermoplastic polyurethane (TPU) foil is treated with an inkjet receiver coating in accordance with the first aspect. In case of presence of binder, the preferred binder for use on such thermoplastic foils is polyurethane based, acrylate based, or polyvinyl acetate based.

It is clear that the present invention also relates a inkjet receiver coating composition having the features described in relation to the first independent aspect. With the same aim as in said first aspect, according to a second independent aspect, the invention also relates to an inkjet receiver coating composition for printing paper or thermoplastic foil, comprising an inorganic pigment, characterized in that said pigment comprises talc, clays, calcined clays, kaolins and/or other aluminum silicates or a combination thereof. The composition of the second independent aspect can comprise one or more of the features described in relation to the first independent aspect.

It is clear that the present invention also relates to paper layers and/or thermoplastic foils that are obtained using the methods of the first aspect of the present invention. With the same aim as in said first aspect, according to a third independent aspect, the invention also relates to a paper or thermoplastic foil for inkjet printing, wherein said paper or foil at least at one side is provided with an inkjet receiver coating comprising at least a pigment, with as a characteristic that said pigment comprises talc, clays, calcined clays, kaolin and/or other aluminum silicates or combinations thereof. Preferably said inkjet receiver coating is free from any binder or has a pigment to binder ratio between 20/1 and 100/1, more preferably between 40/1, even more preferably between 60/1. Preferably said paper or foil comprises from 0.2 to 10 g/m², and even better between 0.5 and 5 g/m², dry coating weight of said ink receiving coating.

Further, said pigment of the inkjet receiver coating is composed for at least the 50%, preferably more than 75%, even more preferably more than 90%, based on the whole pigment weight, of talc, clays, calcined clays, kaolin and/or other aluminum silicates or combinations thereof.

Further, said paper or foil may further show one or more of the following properties:
said paper or foil has a Gurley value of between between 10 and 40 seconds, and preferably between 10 and 40 seconds;
said paper or foil is provided with pigment in an amount having a particle surface area between 100 and 16000 m² surface of pigment/m² surface of paper or foil, and preferably between 150 and 5000 m²/m²;

It is to be noted that said paper or foil can comprise one or more of the features described above in relation to the first independent aspect.

The invention further, in accordance with its fourth independent aspect, relates to a method for manufacturing a laminate panel, wherein said panel at least comprises a substrate material and a provided thereon top layer with a printed decor, wherein said top layer is substantially formed from thermosetting resin and one or more paper layers, wherein said paper layers comprise a decor paper on the basis of a paper for inkjet printing in accordance with the third independent aspect and/or obtained by means of a method in accordance with the first independent aspect and/or the preferred embodiments of these aspects. In accordance with its fifth independent aspect, the invention also relates to a method for manufacturing a laminate or laminated panel, wherein said laminate or laminated panel at least comprises a carrier, such as a non-woven textile sheet, or a substrate material and a provided thereon top layer with a printed decor, wherein said top layer is substantially formed from thermoplastic material including one or more thermoplastic foils, wherein said thermoplastic foils comprise a decor foil on the basis of a thermoplastic foil for inkjet printing obtained by means of a method in accordance with the first independent aspect and/or the preferred embodiments of this first aspect, in as far as they relate to the treatment of thermoplastic foils.

Preferably, in said fourth aspect, the paper for inkjet printing is printed by means of an inkjet printer, is impregnated with an amount of said thermosetting resin and is attached to said substrate material by means of a hot-pressing treatment. Preferably, in said fifth aspect, the thermoplastic foil for inkjet printing is printed by means of an inkjet printer and is attached to said substrate material by means of a hot-pressing treatment. Preferably, said inkjet printer operates on the basis of water-based inks, wherein, more particularly, an inkjet printer of the single-pass type and/or an inkjet printer operated in single-pass mode is preferred.

Clearly, the paper layer having the inkjet receiving layer of the invention may be used in a method for manufacturing panels having a decorative surface, wherein said panels at least comprise a substrate and a top layer comprising thermosetting resin, wherein said top layer comprises a paper layer having a printed pattern, with as a characteristic that for providing said portion of said printed pattern use is made of pigment containing inks deposited on said paper layer by means of a digital inkjet printer, and in that the dry weight of the total volume of said pigment containing inks deposited on said paper layer is 9 grams per square meter or lower, preferably 3 to 4 grams per square meter or lower, wherein for said pigment containing ink use is made of a water based or so-called aqueous ink. The limitation of the dry weight of the applied ink leads to a layer of ink that lowers the risk of pressing defects and splitting in the top layer. Indeed, possible interference between the ink layer and the thermosetting resin during the pressing operation is limited. Because the ink load is limited to a maximum of 9 grams per square meter, wrinkling or expansion of the paper due to the ink can be brought to an acceptable level, which assures stable further processing. Preferably for said pigment containing ink use is made of organic pigments. Organic pigments are known to be more stable when exposed to sunlight, or other sources of UV radiation. Preferably said pigments of said pigment containing ink have an average particle size of less than 300 nanometer. Preferably said dry weight of deposited pigmented ink is 5 grams per square meter or less, for example 4 or 3 grams per square meter or less. Preferably the printed pattern is entirely, or at least essentially, made up of such pigmented ink, wherein the printed pattern covers the majority, and preferably 50 percent or more of the surface of said paper layer. Preferably said total volume of deposited pigment containing ink is less than 15 milliliters, or even better less than 10 milliliter or still less, e.g. 5 milliliter or less.

Preferably, the paper layer of the invention is opaque and/or contains titanium oxide as a whitening agent.

Preferably the printed pattern applied to the paper layer of the invention, covers the majority, and preferably 50 percent or more of the surface of said paper layer Preferably said paper layer is, before or after printing, and before or after application of the inkjet receiver coating, provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

Preferably the paper layer is, before or after printing, and before or after application of the inkjet receiver coating, provided with such an amount of thermosetting resin, that at least the paper core is satisfied with the resin. Such satisfaction can be reached when an amount of resin is provided that corresponds to at least 1.5 or at least 2 times the paper weight. It should be clear that the resin, which is provided on the paper layer, is not necessarily only available in the core of the paper, but may form surface layers on both flat sides of the paper. The inkjet receiver coating may then be present on the surface of the paper with the intermediary of such a surface layer of thermosetting resin. According to a special embodiment, the paper layer is firstly impregnated through or satisfied, and, afterwards, at least at the side thereof to be printed, resin is partially removed and possibly said inkjet receiver coating is provided.

Preferably, the obtained resin provided paper layer, i.e. after provision of the thermosetting resin, has a relative humidity lower than 15%, and still better of 10% by weight or lower.

In general, the paper and inkjet receiver coating, whether provided with resin or not, has a relative humidity lower than 15%, and still better of 8% by weight or lower while printing.

Preferably the step of providing said paper layer with thermosetting resin involves applying a mixture of water and the resin on said paper layer. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or doctor blades to set the amount of resin added to the paper layer.

Preferably said thermosetting resin is a melamine-based resin, more particularly a melamine formaldehyde resin with a formaldehyde to melamine ratio of 1.4 to 2. Such melamine-based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer or give adhesion issues. The available ink layer can hinder the diffusion of the vapor bubbles to the surface, however the present invention provides measures for limiting such hindrance. The inkjet receiver coating is beneficial in this regard as it may provide for an additional buffer for capturing such escaping vapor. When making use of an inkjet receiver coating which is porous and/or hydrophilic, which is the case when using e.g. kaoline and/or polyvinyl alcohol, some of the water vapor originating upon curing the thermosetting resin of the paper layer in the press may be taken up by this coating, such that the process is less prone to the origination of pressing defects, such as locked in water vapor bubbles. Other examples of such thermosetting resins leading to a similar polycondensation reaction include ureum-formaldehyde based resins and phenol-formaldehyde based resins. It is not excluded that other resins like water-based polyurethane dispersions or water-based acrylic dispersions are being used or mixed combination thereof Preferably the paper layer is only impregnated with resin after application of the inkjet receiver coating and after printing. In this way the inkjet receiver coating is not at all effected by the water contained in the water-resin mixture applied for impregnation purposes.

As is clear from the above, the method of the fourth aspect of the invention preferably comprises the step of hot pressing the printed and resin provided paper layer, at least to cure the resin of the obtained resin provided decor paper. Preferably the method of the invention forms part of a DPL process as above described, wherein the printed resin provided paper layer of the invention is taken up in the stack to be pressed as the decorative layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

Preferably a further resin layer is applied above the printed pattern after printing. e.g. by way of an overlay, i.e. a resin provided carrier layer, or a liquid coating, preferably while the decor layer is laying on the substrate, either loosely or already connected or adhered thereto.

The paper layer or foil of the invention may be a colored, pigmented and/or dyed base paper or foil. The use of a colored and/or dyed base layer enables further limiting the dry weight of deposited ink for attaining a particular pattern or color. In the case of paper, preferably the dye or pigment is added to the pulp before the paper sheet is formed. According to an alternative the ink receiving layer on said paper layer or foil to be printed is colored or pigmented with colored pigments. In accordance with the general disclosure, however, the pigments contained in the inkjet receiver coating are preferably colorless or white.

Preferably for printing the paper layer or foil of the invention, a digital inkjet printer is applied that allows to jet ink droplets with a volume of less than 50 picoliters. The inventors have found that working with droplets having a volume of 15 picoliters or less, for example of 10 picoliters, brings considerable advantages regarding the limitation of dry weight of deposited inks. Preferably a digital inkjet printer is applied that allows to work with ink droplets of several volumes in one and the same print, or with so-called halftone or gray scale. The possibility of half tone or gray scale printing enables further limitation of the dry weight of deposited ink while maintaining an excellent print definition. Preferably a digital inkjet printer is applied that allows to attain a definition of at least 200 dpi, or even better at least 300 dpi (dots per inch). Preferably said digital inkjet printer is of the single pass type, wherein the paper layer or foil is provided with said printed pattern in a single continuous relative movement of the paper layer with respect to the printer or print heads. It is not excluded that other digital inkjet printers are used to put the invention into practice, such as so-called multi-pass or plotter type printers. It is noted that printers of the multi-pass type have the advantage that any failing nozzle can be hidden by the print of a subsequent pass. In this type of printers the nozzles can be shifted somewhat in between passes, such that on a particular location of the paper dots are printed by several nozzles. With a multi-pass equipment, or even with a plotter it is possible to perform automatic maintenance or cleaning in between subsequent passes, when needed. The issue with failing nozzles is especially relevant when water based or so-called aqueous pigment containing inks are being used. Indeed, nozzles can get clogged by the ink pigment because the water has dried up. The risks of failing nozzles is lower e.g. with hydro-UV or UV curable inks. Also, when an inkjet receiver coating is used, normally, the risk of failing nozzles may rise. However, the dual layer application of the inkjet receiver coating in accordance with the first aspect of the present invention enhances the time of autonomous production due to a diminished dust release.

It is clear that, according to the most preferred embodiment of the present invention, the paper layer, while printing, is still flexible and that the paper layer is only attached or put on the plate shaped substrate after printing. According to a variant the paper layer is already attached or loosely laid on the plate shaped substrate while printing. The possible attachment with the substrate can be reached by means of urea based, phenol based, melamine based, polyurethane based glues and similar adhesives. Such attachment can be attained by means of a pressing treatment, whether or not a heated press treatment.

Preferably, the method of the fourth aspect of the invention further comprises the step of applying a counter layer or balancing layer at the surface of the substrate opposite the printed paper layer. The case of a paper-based decor layer, the counter layer or balancing layer preferably comprises a paper layer and thermosetting resin, preferably the same resin as the top layer.

Preferably the mutual adherence of the plate-shaped substrate, the possible counter layer and the possible transparent or translucent layer is obtained in one and the same press treatment. According to the most preferred embodiment of the fourth aspect, these steps are taken up in a DPL process.

According to the most important example of the invention, a standard printing paper, like the one used for rotogravure, having a weight between 60 and 90 grams per square meter is provided with an inkjet receiver coating in accordance with the first aspect of the invention, and is printed with a wood pattern using a digital inkjet printer with aqueous pigmented inks. Subsequently the printed paper layer is provided with melamine resin by means of a standard impregnation channel; namely by means of roller, immersion, jetting and/or spraying equipment. The resin provided paper layer is then dried until a residual humidity of less than 10%, preferably about 7%, is reached. A stack is formed of a resin provided counter layer, a plate shaped substrate, the printed resin provided paper layer and a resin provided paper layer forming a so-called overlay.

The stack is then pressed during less than 30 seconds at a temperature of about 180-210° C. and a pressure of more than 20 bar, for example 38 bar. While pressing the surface of the stack contacts a structured press element, such as a structured press plate, and a relief is formed in the top layer of the obtained laminate panel. Possibly the obtained relief can be formed in register with the printed pattern of the resin provided paper layer.

It is further clear that the paper or thermoplastic foil obtained in the first aspect of the invention is suitable for use as a decor paper, respectively decor foil, in a method for manufacturing floor panels, furniture panels, ceiling panels and/or wall panels.

It is clear that the printed pattern, the plate-shaped substrates, the paper layers and thermoplastic layers mentioned above may have to be divided during the methods of the invention for obtaining their respective final dimensions. The panels obtained by means of a DPL press treatment or similar are preferably sawn or otherwise divided. Other treatments of the obtained panels are of course not excluded.

The base paper of the decor paper produced by means of the method of the invention preferably has a base paper weight. i.e. without ink receiving coating, higher than 20 grams per square meter, wherein, in the case of floor panels, a weight between 55 and 95 grams per square meters is obtained.

The base foil of the decor foil or the base paper of the decor paper, produced by means of the method of the invention preferably has a thickness of 0.05 millimeter or more, wherein a thickness between 0.05 and 0.5 millimeter is preferred.

BRIEF DESCRIPTION OF THE DRAWINGS

With the intention of better showing the characteristics according to the invention, in the following, as an example without limitative character, an embodiment is described, with reference to the accompanying drawings, wherein.

DESCRIPTION OF NON-LIMITING EMBODIMENTS

Figure 1:
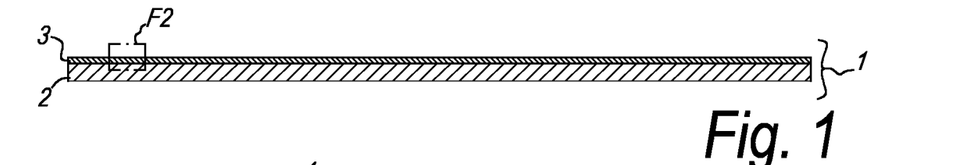
FIG. 1 schematically shows an embodiment of a paper layer that has been provided with an inkjet receiving coating in accordance with a preferred embodiment of the method of the fast aspect of the invention.

FIG. 1 schematically illustrates a treated paper layer 1 that is printable with an inkjet printer. The printable paper layer 1 comprises a paper sheet 2 provided with an inkjet receiver coating 3. The paper sheet 2 is, in this case, a base printing paper having a weight of about 70 grams per square meter and with a mean air resistance as expressed by Gurley value of between 10 and 30 seconds.

Figure 2:
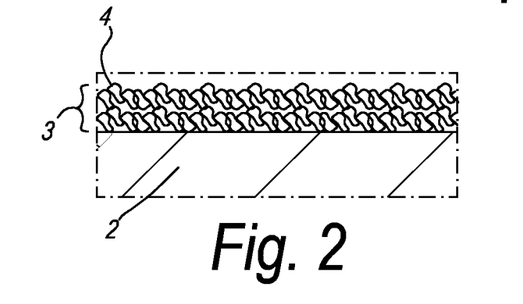
FIG. 2 on a larger scale provide a view on the area F2 illustrated in FIG. 1.

It is generally noted that the dimensions of the represented paper sheet 2 and the inkjet receiver coating 3 is, in the figures, drawn out of scale in order to better illustrate the invention.

FIG. 2 shows that the inkjet receiver coating 3 comprises pigments 4. In the preferred embodiment the pigment substantially consists of kaolinic clay. The inkjet receiver coating 3, further comprises an ink reactive compound, more particularly a flocculating agent and/or a dispersant, such in accordance with the first aspect of the invention. It is clear however that the figures are also illustrative for many aspects of the present invention in the cases where a ink reactive compound, more specifically an ink destabilizing agent, other than a flocculating agent has been applied, such as for example a cationic metal salt.

In the illustrated example, the inkjet receiver coating 3 is free from any binder and any crosslinker. In other embodiments, the inkjet receiver coating 3 can comprise a binder in an amount below 5, more preferably below 1% of the dry weight of the coating.

Figure 3:
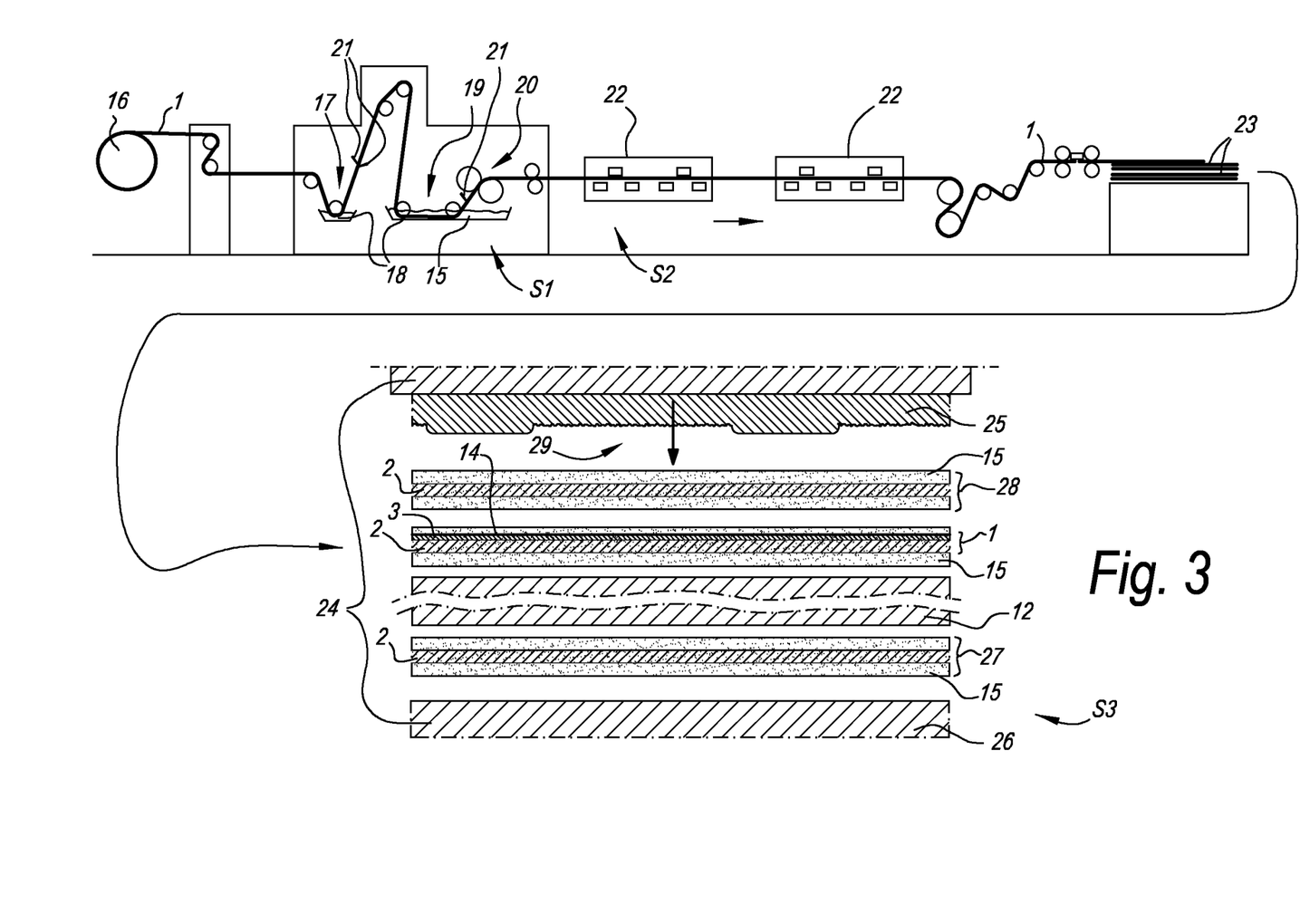
FIG. 3 shows some steps in a method in accordance with the fourth aspect of the invention.
Figure 4:
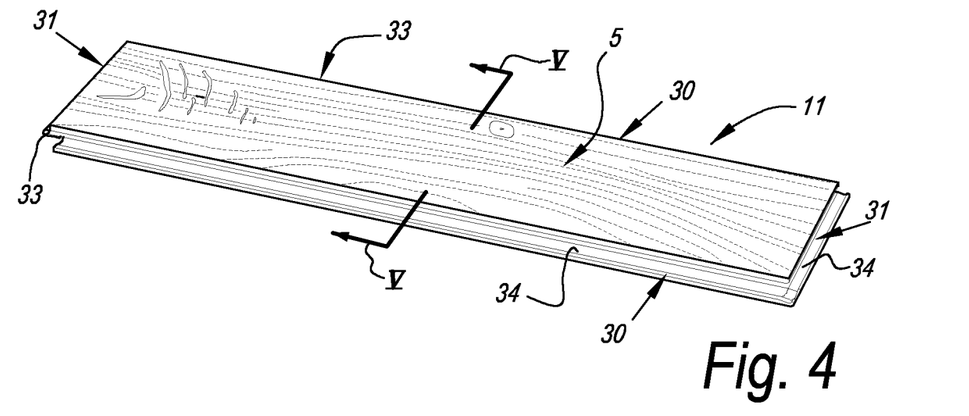
FIG. 4 shows in perspective a panel obtained by means of the method of FIG. 3.

FIG. 3 illustrates some steps of a method for manufacturing laminate panels 11 of the type shown in FIG. 4. The method forms an illustration of the fourth independent aspect of the invention as described in the introduction of the present patent application. The obtained decorative panels 11 at least comprise a substrate 12 and a top layer 13. The top layer 13 comprises a paper layer 1, manufactured in accordance with the first aspect, and provided with a printed pattern or a digitally printed ink layer 14 representing a wood pattern, as is the case here. The method of the example embodiment comprises at least the step S1 of providing said paper layer 1 having the inkjet receiving layer and the printed pattern with thermosetting resin 15. Hereto the paper layer 1 is taken from a roll 16 and transported to a first impregnation station 17 where said paper layer is immersed in a bath 18 of said resin 15, more particularly a mixture of water and resin 15. The paper layer 1 is then allowed to rest while in this case being transported upwards. The resting allows for the resin 15 to penetrate the paper core. The paper layer 1 then comes into a second impregnation station 19 where the paper layer 1 is, in this case, again immersed in a bath 18 of resin 15, more particularly a mixture of water and resin 15. A set of squeezing rollers 20 allows to dose the amount of resin 15 applied to the paper layer 1.

In the example several doctor blades 21 are available for partially removing resin at the surface of the resin provided paper layer 1.

In a second step S2 the resin provided paper layer 1 is dried and its residual humidity level is brought to below 10%. In the example hot air ovens 22 are used, but alternatively other heating equipment can be used, such as microwave or infrared drying equipment.

FIG. 3 also illustrates that the continuous paper layer 2 is cut to sheets 23 and stacked.

FIG. 3 further illustrates that in a subsequent step S3 the obtained sheets 23 or the paper layer 1 is taken up in a stack to be pressed in a short daylight press 24 between upper and lower press plates 25-26. Said stack comprises from bottom to top a counter layer 27, a plate shaped substrate 12, the abovementioned paper layer 1 and a protective layer 28, wherein the counter layer 27 and the protective layer 28 both comprise a paper sheet 2 and resin 15. The stack is then pressed and the press treatment results in a mutual connection between the constituent layers 1-12-27-28, including the substrate 12, of the stack, as well as in a hardening or curing of the available resin 15. More particularly here a polycondensation reaction of the melamine formaldehyde resin 15 takes place, having water as a by-product.

The upper press plate 25 is a structured press plates that provides a relief in the melamine surface of the panel 1 during the same press treatment of the step S3, by bringing the structured surface 29 of the upper press plate 25 into contact with the melamine of the protective layer 28.

Figure 5:
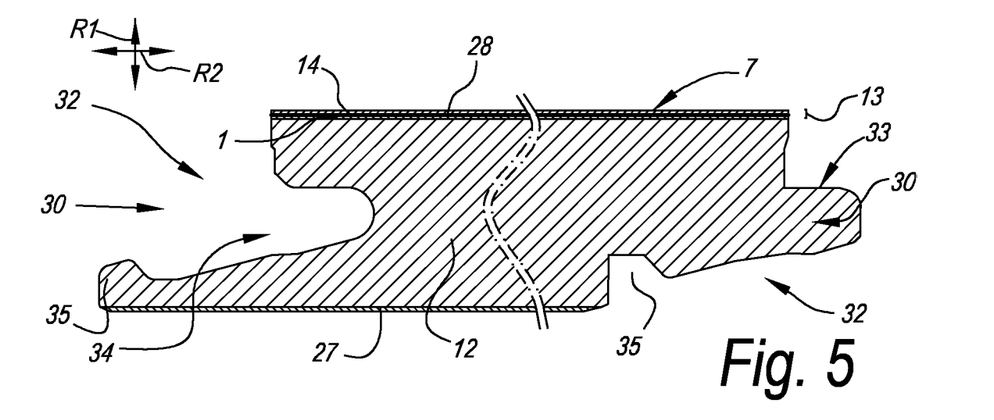
FIG. 5 shows a view according to the line V-V indicated on FIG. 4.

FIG. 4 illustrate that the obtained decorative panel or laminate panel 11 can have the shape of a rectangular and oblong laminate floor panel, with a pair of long sides 30 and a pair of short sides 31 and having an HDF or MDF substrate 12. In this case the panel 11 is at long at least the long sides 30 with coupling means 32 allowing to lock the respective sides 30 together with the sides of a similar panel both in a direction R1 perpendicular to the plane of the coupled panels, as in a direction R2 perpendicular to the coupled sides and in the plane of the coupled panels. As illustrated in FIG. 5 such coupling means or coupling parts can basically have the shape of a tongue 33 and a groove 34, provided with additional cooperating locking means 35 allowing for said locking in the direction R2.

Figure 6:
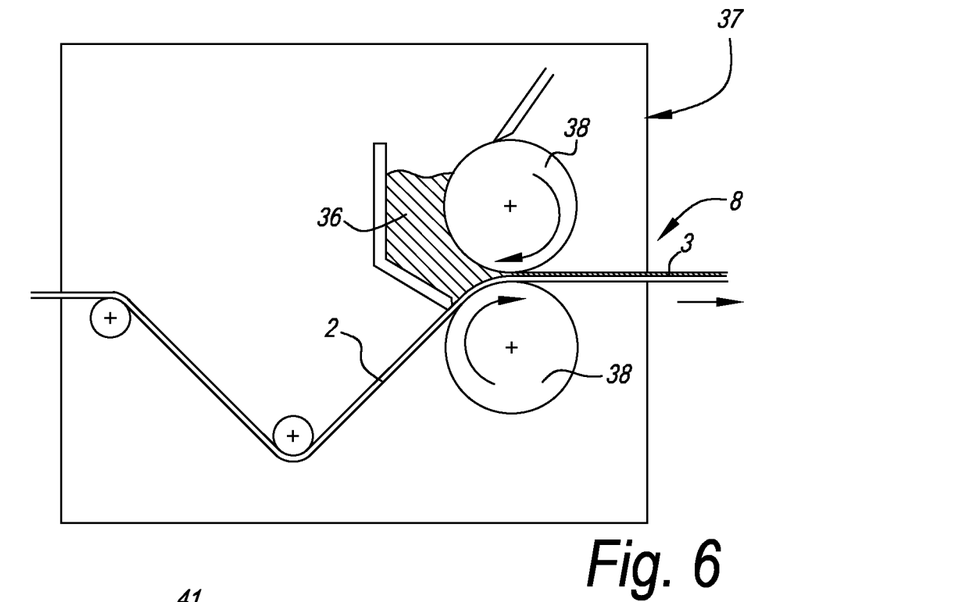
FIG. 6 shows a piece of equipment for use amongst others in the first aspect of the invention.

FIG. 6 shows that, in accordance with a preferred embodiment, the inkjet receiver coating 3, may be obtained by coating a liquid substance 36 to the paper sheet 2. A device 37 comprising reverse metering rollers 38 is applied. Such device 37 may initially apply an excess of the liquid substance 36, which is squeezed off to the desired weight by means of the rollers 38, which also may provide for a smooth coating surface. Preferably, the obtained half product 8 is then dried, e.g. by means of a hot air oven, to reach a residual humidity level of preferably below 10%, or of about 7%. Such is here not illustrated, but this may be executed in a fairly similar way. It is clear that as an alternative to the device 37, other application techniques may be used, such as application by one or more gravure rollers, possibly also running in reverse, or with a size press or a film press, preferably in line with the paper machine. Wherein with paper machine is meant the line for the production of the paper. For example said device 37 can be a film press that applies the inkjet receiver coating between two drying steps on 20, the machine paper.

Figure 7:
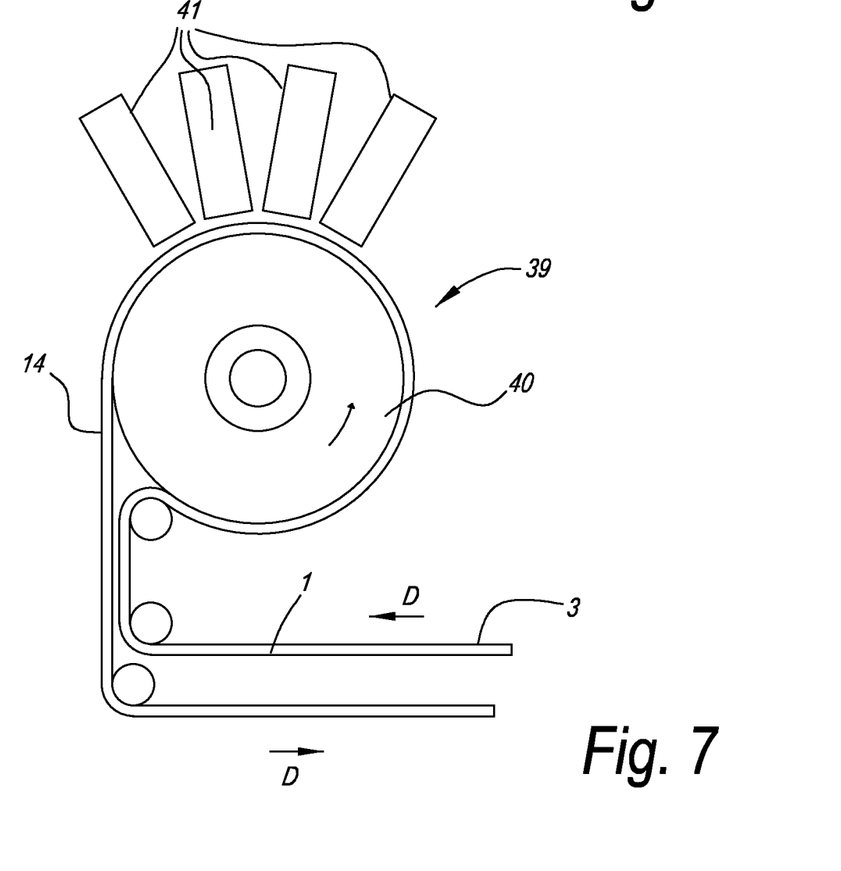
FIG. 7 schematically shows a side view of a printer operated in single-pass mode on a central cylinder.

FIG. 7 illustrates that the paper layer 1 having the inkjet receiver coating of the first aspect of the invention may be printed by means of an inkjet printer 39, which, in this example comprises a central cylinder 40 upon which the paper layer 1 is partially wound and several printing units 41, each comprising one or more print heads, disposed radially around the central cylinder 40 and over the area of the paper layer 1 to be printed. For example, the central cylinder 40 of the inkjet printer 39 comprises a radius between 800 and 950 mm, for example around 880 mm, and comprises a web angle above 270°, for example above 300°, preferably 320°. The printer 39, in this example, relates to a printer of the single pass type, wherein the provision of the printed pattern involves a relative motion of said inkjet printer 39, more particularly the printing unit 41, and said paper layer 1 during printing in a printing direction D. In this case, the printing unit 41 and the print heads are at standstill, while the paper layer 1 moves during ejection of inks onto the paper layer 1, more precisely onto the inkjet receiver coating 3 applied to the paper sheet. The paper layer 1 gets printed during a single continuous movement of the paper layer 1 relative the printer 39 or the rows 40 of print heads.

With the intention of further illustrating the invention, here below, without any limitative character, some more exemplary embodiments are listed.

Example A 33 kg of commercially available kaolin (Imerys argirec B24 was dispersed in 55 kg of water. Then 10 kg of pure Calcium Chloride flakes acting as flocculant, was added and let stir for 10 minutes.

Separately 0.3 kg of polyvinylalcohol (mowiol 20/98 Kuraray) was dissolved in 1.7 kg of water at 90° C. and left stirring until this was completely dissolved (2 hours).

Hereafter the kaolin dispersion was added to the mowiol solution at room temperature and stirred thoroughly. Then the coating was bottled The pigment to binder ratio was 100/1 and the solids content was 43.3% by weight.

The coating shows the correct viscosity for coating with a reverse gravure roller (15-17 s DinCup4).

The blank paper (Kohler white decor paper) selected for the test has a weight of 72 g % m$^2$ and a starting Gurley value of 13 seconds.

On the blank paper 5 g/m$^2$ of the coating was applied by means of a reverse gravure roller and dried to a dried solid content of 2.2 g/sqm. Coated paper showed a Gurley value of 16 s.

Example B 44 kg of commercially available kaolin (Imerys argirec B24) was dispersed in a mixture of 41.5 kg of water and 2.5 kg of a 40% aqueous solution of polyDADMAC (polyquat40U05 by Katpol). The polyDADMAC is a polyionic polymer that functions as a dispersion agent. Then 10 kg of pure CaCl$_2$) flakes, acting as flocculant, was added and let stir for 10 minutes.

Separately 0.5 kg of mowiol 20/98 (Kuraray) was dissolved in 1.5 kg of water at 90° C. and left stirring until this was completely dissolved (2 hours).

Hereafter the kaolin dispersion was added to the mowiol solution at room temperature and stirred thoroughly. Then the coating was bottled.

The pigment to binder ratio was 88/1 and the solids content was 54.9% by weight.

The coating owns the correct viscosity for coating with a reverse gravue roller (15-17 s DinCup4).

The blank paper (Kohlerwhite decor paper) selected for the test has a weight of 72 g/m$^2$ and a starting Gurley value of 13 seconds.

On a blank paper (Kohler white décor paper) 5 g/m$^2$ of the coating was applied by means of a reverse gravure roller and dried to a dried solid content of 2.8 g/sqm. Coated paper showed a Gurley value of 16 s.

Example C 5 kg of commercially available kaolin ((Imerys argirec B24) was dispersed in 82.3 kg of water. After this 0.7 kg of a 40% aqueous solution of polyDADMAC (polyquat40U05 by Katpol) was added and let stir for 10 minutes. Then 12 kg of pure CaCb flakes, acting as flocculant, was added and let stir for another 10 minutes.

This coating composition has been prepared without the addition of any binder.

The solids content was 17.3% by weight.

The coating already has a low viscosity (10 s DinCup4) suitable for reverse gravure coating.

The blank paper (Kohler white décor paper) selected for the test has a weight of 72 g/m$^2$ and a starting Gurley value of 13 s.

On a blank paper, 5 g/m$^2$ of the coating was applied by means of a reverse gravure roller and dried to a dried solid content of 0.87 g/m$^2$. Coated paper showed a Gurley value of 15 s.

Print Proofing:

A premetered application method was used to apply ink on the treated papers of examples A to C, as well as on untreated base paper (Kohler white decor paper), labelled as paper D, and a commercially available inkjet quality paper, labelled as paper E.

Gurley value and dust release were measured on coated samples. The Gurley value reported below as result of the test, represent the time to pass for 100 cubic centimeters of air to pass the paper. Dust release was measured with an internal test by rubbing the coating and by ranking the behavior of the paper from 1, corresponding to no dust release after rubbing, to 5 corresponding to the all coating becoming loose.

A K printing proofer by RK printcoat instruments was used with the 100 lines/cm printing plate and a water based red digital printing ink.

The prints were then analyzed by a X-rite Exact spectrophotometer by measuring the L, a, b and OD (Optical Density) value. A higher OD value means a better optical density and means a better image quality. In the present case has been measured optical density of Magenta OD(M).

Figure 8:
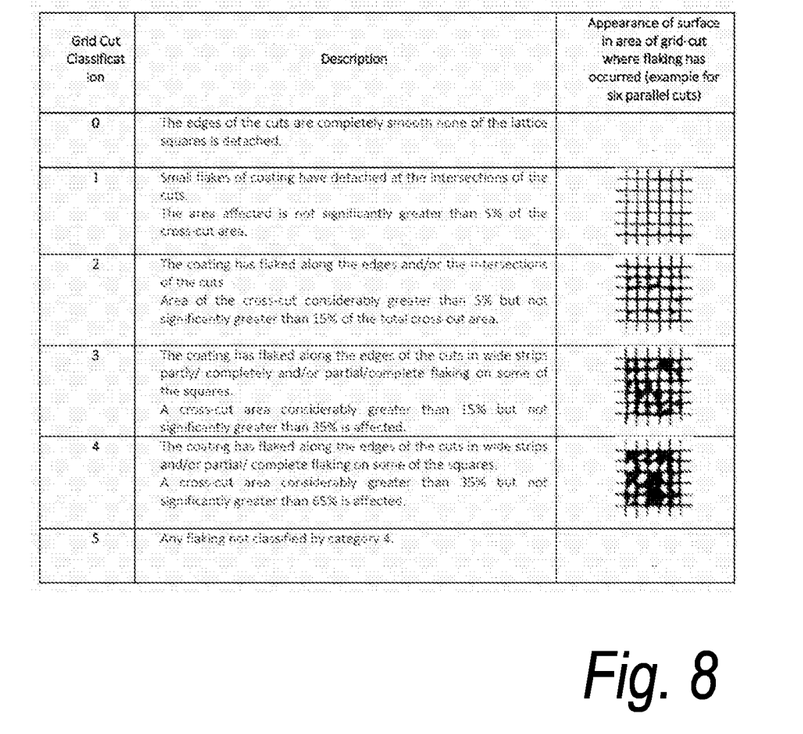
FIG. 8 shows a table for ranking samples according to DIN EN ISO 2409.

To measure resin penetration time and lamination all the samples were impregnated with the same resin by immersion in a bath of melamine-formaldehyde resin and dried at 140° C. for 73 seconds. The impregnated samples were laminated onto an HDF board with overlay in a press applying a pressure of 60 kg/cm$^2$ at a temperature of 195° C. for 22 seconds. Adhesion after pressing has been measured with the cross-cut test according to DIN EN ISO 2409 that involves making a grid of cross cuts on the surface of the laminate, evaluating the edges of said cuts, the presence of flakes and the detachment of lattice square. Afterwards, an adhesion test is carried out with a defined adhesive tape. The tape is pressed onto the lattice with force before being pulled off at an even speed (between 0.5-1 sec). The surface is rated according to the table illustrated in FIG. 8 from 0 to 5 where 0 means that the cut edges are smooth and free of flakes and that there is no detachment of lattice squares, and 5 means that the coating and surface finish flakes in wide strips and/or that some square of the grids are completely flaked, and that more than the 65% of the crosscut area is affected.

The tests results are collected in table 1 below.

| Sample | Paper weight (g/m²) | Gurley (s) | Dust release (1-5) | Optical Density (Magenta) | Resin penetration time (s) | Adhesion after pressing (0-5) |
|---|---|---|---|---|---|---|
| D | 72 | 13 | 1 | 0.60 | <3 | 0 |
| E | 80 | 30 | 2 | 1.05 | 6-10 | 4 |
| A | 74 | 16 | 1 | 1.05 | <3 | 0 |
| B | 74 | 16 | 1 | 1.05 | <3 | 0 |
| C | 73 | 15 | 1 | 1.05 | <3 | 0 |

From table 1 it can be seen that the samples A, B and C show no dust release as an uncoated paper D thereby improving the dust release performance compared to commercially available coated inkjet paper E. At the same time the samples from A to C show the same printing performance of the commercially available inkjet paper E based on optical density of magenta. Moreover the samples from A to C show a very tiny increase of Gurley of the uncoated paper D that provides for a better and faster impregnation of the resin, which contributes to a better adhesion of the impregnated printed paper on the panel after lamination.

The present invention is in no way limited to the above described embodiments, but such methods, paper layers, thermoplastic foils and vitrimeric foils may be realized according to several variants without leaving the scope of the invention.

The invention claimed is:

1. A method for manufacturing paper printable with pigment containing inks in an inkjet printer for use as a decor paper in a laminate panel, the method comprising:
    providing a paper layer;
    coating at least one side of the paper layer with an inkjet receiver coating that includes at least a pigment;
    wherein the pigment is kaolin;
    wherein the pigment has particles of a size in between 0.5 and 5 µm;
    wherein the inkjet receiver coating is a composition that includes a binder that represents less than 5% based on dry weight of the composition;
    wherein the inkjet receiver coating includes a flocculant;
    wherein the flocculant is a metal salt;
    wherein the metal salt is calcium chloride; and
    wherein the flocculant content is between 20% and 60% based on dry weight of the composition;
    wherein the paper layer with the inkjet receiver coating has a Gurley value between 10 and 60 seconds.

2. The method of claim 1, wherein the binder represents less than 1% based on dry weight of the composition; or wherein the composition is binder free.

3. The method according to claim 1, wherein the kaolin represents more than 50% based on the whole pigment weight.

4. The method according to claim 1, wherein the pigment has particles of a BET surface area of more than 30 m²/g.

5. The method according to claim 1, wherein the pigment represents between 30 and 85% based on dry weight of the composition of the inkjet receiver coating.

6. The method according to claim 1, wherein a pigment to binder ratio is higher than 20/1.

7. The method according to claim 1, wherein the inkjet receiver coating comprises a dispersant.

8. The method according to claim 7, wherein a pigment/dispersant ratio is between 10/1 and 100/1.

9. An inkjet paper printable with pigment containing inks, the inkjet paper comprising:
    an inkjet receiver coating including an inorganic pigment;
    wherein the inorganic pigment is kaolin;
    wherein the pigment has particles of a size in between 0.5 and 5 µm;
    wherein the inkjet receiver coating is a composition that includes a binder that represents less than 5% based on dry weight of the composition;
    wherein the inkjet receiver coating includes a flocculant;
    wherein the flocculant is a metal salt;
    wherein the metal salt is calcium chloride;
    wherein the flocculant content is between 20% and 60% based on dry weight of the composition;
    wherein the inkjet paper has a Gurley value between 10 and 60 seconds.

10. The inkjet paper according to claim 4, wherein the inkjet receiver coating is provided with a dry weight of between 0.2 and 5 g/sqm.

\* \* \* \* \*